United States Patent
Baumgartner

(10) Patent No.: US 7,196,494 B2
(45) Date of Patent: Mar. 27, 2007

(54) METHOD AND APPARATUS FOR CHARGING BATTERIES IN A SYSTEM OF BATTERIES

(75) Inventor: Robert Baumgartner, Mission (CA)

(73) Assignee: Xantrex International, St. Michael (BB)

( * ) Notice: Subject to any disclaimer, the term of this patent is extended or adjusted under 35 U.S.C. 154(b) by 271 days.

(21) Appl. No.: 10/688,659

(22) Filed: Oct. 17, 2003

(65) Prior Publication Data

US 2005/0083014 A1    Apr. 21, 2005

(51) Int. Cl.
*H01M 10/44* (2006.01)
(52) U.S. Cl. .................................... 320/116
(58) Field of Classification Search .............. 320/116, 320/118, 119, 120, 122
See application file for complete search history.

(56) References Cited

U.S. PATENT DOCUMENTS

| | | | |
|---|---|---|---|
| 3,895,284 A | 7/1975 | Schweizer et al. | |
| 4,194,146 A | 3/1980 | Patry et al. | |
| 4,247,812 A | 1/1981 | Patry et al. | |
| 4,677,363 A | 6/1987 | Kopmann | |
| 5,504,415 A | 4/1996 | Podrazhansky et al. | |
| 5,514,946 A | 5/1996 | Lin et al. | |
| 5,539,298 A | 7/1996 | Perkins et al. | |
| 5,982,143 A * | 11/1999 | Stuart | 320/119 |
| 6,008,623 A | 12/1999 | Chen et al. | |
| 6,046,573 A | 4/2000 | Wikström | |
| 6,064,178 A | 5/2000 | Miller | |
| 6,150,795 A * | 11/2000 | Kutkut et al. | 320/118 |
| 6,194,867 B1 | 2/2001 | Cummings et al. | |
| 6,281,661 B2 | 8/2001 | Kaite et al. | |
| 6,388,425 B1 | 5/2002 | Petrovic | |
| 6,452,363 B1 | 9/2002 | Jabaji | |
| 6,844,703 B2 * | 1/2005 | Canter | 320/131 |

FOREIGN PATENT DOCUMENTS

WO    WO 99/01918 A2    1/1999

* cited by examiner

*Primary Examiner*—Edward H. Tso
(74) *Attorney, Agent, or Firm*—Christensen O'Connor Johnson Kindness PLLC

(57) ABSTRACT

A method and apparatus for charging batteries in a system of batteries. The method and apparatus involve producing a set of state of charge signals indicative of the states of charge of each battery in the system, successively identifying, from the state of charge signals, a most discharged battery in the system and applying a charging current to the most discharged battery for at least part of a first period of time less than a period of time required to fully charge the most discharged battery before identifying a succeeding most discharged battery in said system. The batteries are charged according to a dynamic charging sequence in which batteries are added into the charging sequence in order of increasing state of charge as batteries already in the charging sequence are charged to exceed the state of charge of a battery having the next higher state of charge relative to the state of charge of the batteries already in the charging sequence.

78 Claims, 12 Drawing Sheets

METHOD AND APPARATUS FOR CHARGING BATTERIES IN A SYSTEM OF BATTERIES

BACKGROUND OF THE INVENTION

1. Field of Invention

This invention relates to battery chargers and more particularly to methods and apparatus for charging batteries in a system of batteries.

2. Description of Related Art

Multi-battery and multi-battery-bank battery systems are finding increased usage. Usage of such systems often requires charging of batteries or banks of batteries and many ways of charging have been developed. One way is to employ a single charger with a plurality of diode-isolated output stages. Another way is to employ a plurality of individual chargers all enclosed within a single enclosure. Another way is to employ a single common primary (high voltage) side architecture with either a single or multiple transformers and a plurality of secondary side isolated or non-isolated rectifier stages. Another way is to provide a single main charger module with a plurality of secondary side post regulator circuits for auxiliary battery banks for individual bank control. Another way of charging multiple batteries or battery banks is to use a single full power charger with time-domain multiplexed output stage connectable to a plurality of batteries or battery banks.

Traditional marine style multi-bank battery chargers employ the diode-isolated method described above. A diode-isolated system typically involves the use of two or more diodes connected together to prevent current flowing from one battery to another while permitting current to flow through both or all diodes at the same time allowing all batteries or battery banks to be charged at the same time. In such a system, current from the battery charger is split or shared approximately equally between batteries or battery banks when all the batteries or battery banks being charged have approximately the same state of charge. If any one battery has a lower state of charge than the other batteries or battery banks in the system, that battery or battery bank receives most of the charging current until its state of charge is approximately equal to the next lowest charged battery and then two batteries draw current from the charger and so on. This process continues until all batteries or battery banks are charged but it places an increasing load on the charger because charging is done on all of the batteries simultaneously.

Unfortunately, diode-isolated systems are not readily adaptable to permit charging to be specifically controlled for any particular battery. This limits the ability of the batteries or battery banks to be efficiently charged and often requires that the same type of battery be used at every battery or battery bank position in the battery system since the use of the same charging methodology with batteries of different battery chemistries will often result in one battery being overcharged while another battery remains undercharged.

The use of multiple chargers is wasteful in that often one battery is severely discharged while another may be nearly fully charged such that only 1/n of the available power is available for charging an individual bank.

The single common primary scheme described above often requires that each of the secondary side rectifiers be rated for the full power of the charger and usually such systems fail to provide for individual control of current and voltage to any given battery or battery bank.

Systems employing the single main charger and secondary side post regulator circuits require a plurality of secondary side control circuits. Often these systems are configured such that there is a full power high priority bank with a plurality of reduced power outputs.

SUMMARY OF THE INVENTION

In accordance with one aspect of the invention there is provided a method for charging batteries in a system of batteries. The method involves charging the batteries according to a dynamic charging sequence in which batteries are added into the charging sequence in order of increasing state of charge as batteries already in the charging sequence are charged to exceed the state of charge of a battery having the next higher state of charge relative to the state of charge of the batteries already in the charging sequence.

In accordance with another aspect of the invention there is provided a method for charging batteries involving producing a set of state of charge signals indicative of the states of charge of each battery in the system, successively identifying, from the state of charge signals, a most discharged battery in the system and applying a charging current to the most discharged battery for at least part of a first period of time less than a period of time required to fully charge the most discharged battery before identifying a succeeding most discharged battery in said system.

In accordance with another aspect of the invention, there is provided an apparatus for charging batteries in a system of batteries. The apparatus includes a state of charge signal generator operable to produce state of charge signals indicative of the states of charge of each battery in the system, a power supply operable to produce a charging current, a current distributor operable to selectively connect each battery in the system to the power supply in response to a control signal and a controller. The controller is configured to communicate with the state of charge signal generator to produce a set of the state of charge signals indicative of the states of charge of each battery in the system and successively identify, from the set of state of charge signals, a most discharged battery in the system. The controller is also configured to produce the control signal so as to cause the current distributor to selectively connect the most discharged battery to the power supply such that the most discharged battery receives the charging current from the power supply for at least part of a first period of time less than a period of time required to fully charge the most discharged battery, before identifying a succeeding most discharged battery in said system.

In accordance with another aspect of the invention, there is provided an apparatus for charging batteries in a system of batteries. The apparatus includes provisions for producing a set of state of charge signals indicative of the states of charge of each battery in the system, provisions for successively identifying, from the state of charge signals, a most discharged battery in the system and provisions for applying a charging current to the most discharged battery for at least part of a first period of time less than a period of time required to fully charge the most discharged battery before identifying a succeeding most discharged battery in said system.

In accordance with another aspect of the invention there is provided a method for use in a charger for charging batteries in a system of batteries. The charger includes a state of charge signal generator operable to produce state of charge signals indicative of the states of charge of each battery in the system, a controllable power supply operable to produce a charging current, a current distributor operable to selectively connect each battery in the system to the power supply in response to a control signal, and a controller operable to communicate with the state of charge signal generator, the power supply and the current distributor. The method is a method of operating the controller and involves causing the controller to communicate with the state of charge signal generator to produce a set of the state of charge signals indicative of the states of charge of each battery in the system, causing the controller to successively identify, from the state of charge signals, a most discharged battery in the system and causing the controller to produce the control signal to cause the current distributor to selectively connect the most discharged battery to the power supply such that the most discharged battery receives charging current from the power supply for at least part of a period of time less than a period of time required to fully charge the most discharged battery, before causing the controller to identify a succeeding most discharged battery in said system.

In accordance with another aspect of the invention there is provided a computer readable medium comprising codes for directing a controller in a charger for charging batteries in a system of batteries. The charger includes a state of charge signal generator operable to produce state of charge signals indicative of the states of charge of each battery in the system, a controllable power supply operable to produce a charging current and a current distributor operable to selectively connect each battery in the system to the power supply in response to a control signal. The controller is operable to communicate with the state of charge signal generator, the power supply and the current distributor. The computer readable medium includes codes readable by the controller for directing the controller to communicate with the state of charge signal generator to produce a set of the state of charge signals indicative of the states of charge of each battery in the system, and to successively identify, from the state of charge signals, a most discharged battery in the system. The codes also direct the controller to produce a control signal to cause the current distributor to selectively connect the most discharged battery to the power supply such that the most discharged battery receives charging current from the power supply for at least part of a period of time less than a period of time required to fully charge the most discharged battery, before causing the controller to identify a succeeding most discharged battery in said system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
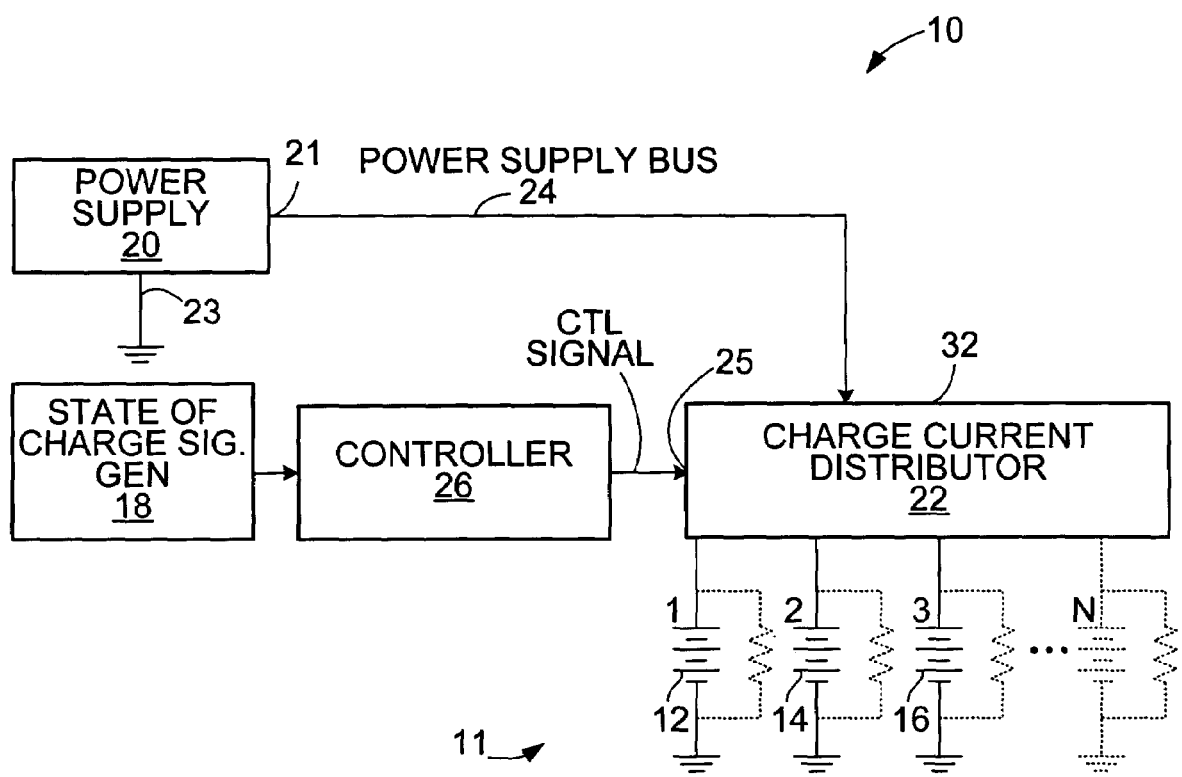
FIG. 1 is a block diagram of an apparatus according to a first embodiment of the invention.

Referring to FIG. 1, a system of batteries is shown generally at 11. The system may include any number "n" of batteries. For explanatory purposes the system includes three batteries 12, 14, and 16, which may include separate batteries or separate banks of batteries. The batteries 12, 14, and 16 may be of the same type such as lead-acid type or may be of different types, such as lead acid and nickel-cadmium, nickel metal hydride or any other types, for example.

An apparatus for charging the batteries 12, 14, and 16 in the system, according to a first embodiment of the invention is shown generally at 10. Generally, the apparatus 10 includes a state of charge signal generator 18 operable to produce state of charge signals indicative of the states of charge of each battery 12, 14, and 16 in the system 11. The apparatus 10 further includes a power supply 20 operable to produce a charging current and further includes a current distributor 22. Desirably the power supply may be controllable in that its voltage and current may be controlled. The power supply may be of the constant voltage, or constant current types.

The power supply 20 has positive and negative poles 21 and 23. The positive pole 21 is connected to the current distributor 22 by a power supply bus 24 and the current distributor is operable to selectively connect each battery 12, 14 and 16 in the battery system 11 to the power supply bus 24, in response to a control signal. The apparatus 10 further includes a controller 26 configured to effect a charging process in which it communicates with the state of charge signal generator 18 to produce sets of state of charge signals indicative of the states of charge of each battery 12, 14 and 16 in the battery system 11. The controller itself may be part of the state of charge signal generator 18. As part of this charging process, the controller 26 is also configured to successively identify from a given set of state of charge signals a most discharged battery in the system of batteries 11 and to produce the control signal for reception at an input 25 of the charge current distributor 22. The control signal is produced to cause the charge current distributor 22 to selectively connect the most discharged battery in the system to the power supply 20 by connecting at least one pole of the power supply to the most discharged battery such that the most discharged battery receives the charging current from the power supply bus 24 for at least part of a period of time less than a period of time required to fully charge the most discharged battery, before communicating again with the state of charge signal generator 18 to identify a succeeding most discharged battery in said system.

Figure 2:
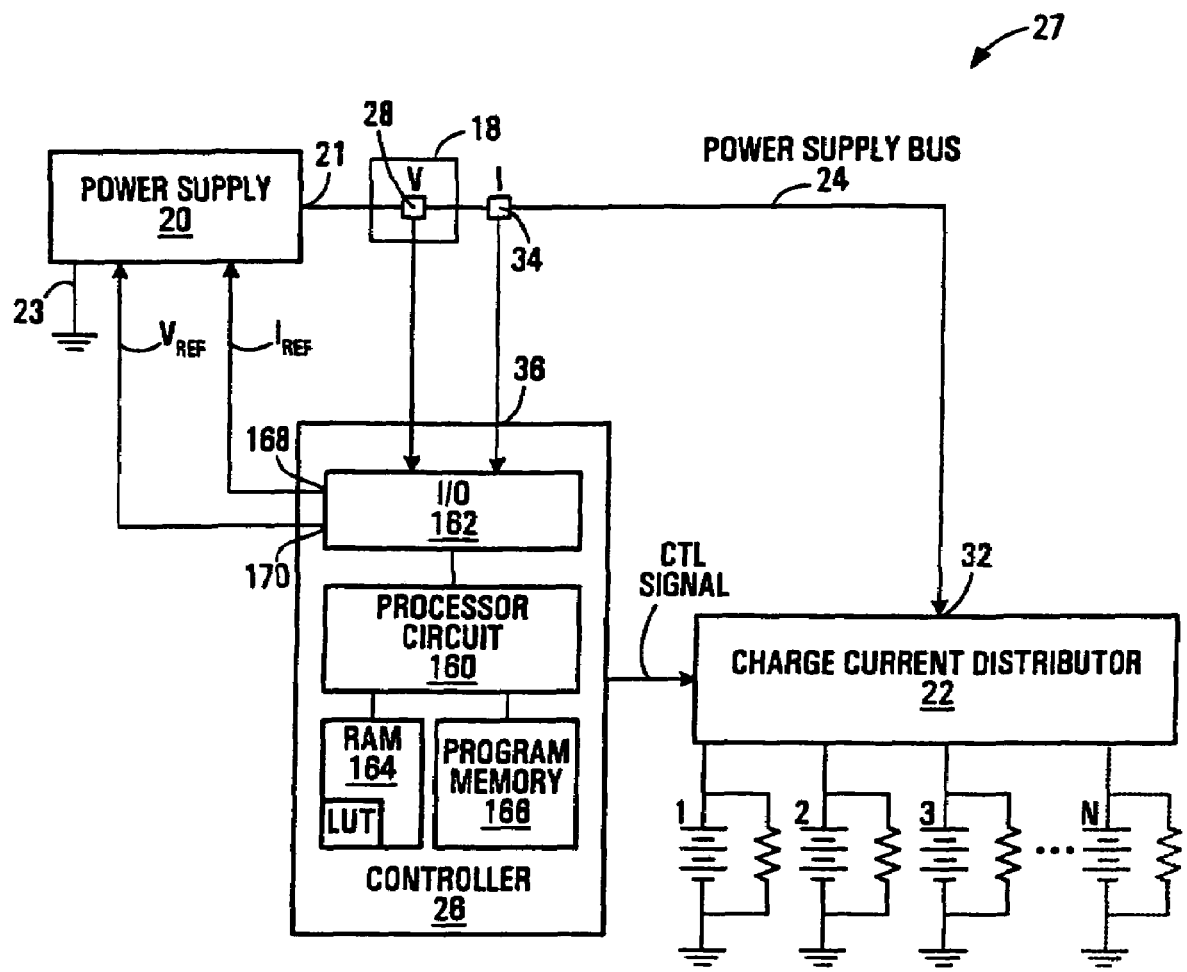
FIG. 2 is a block diagram of an apparatus according to a second embodiment of the invention.

The state of charge signal generator 18 may include any device that produces a signal indicative of the state of charge of a battery 12, 14 and 16 in the battery system 11. Referring to FIG. 2, a second embodiment of the invention is shown at 27 in which the state of charge signal generator 18 includes a voltage sensor 28 in communication with the power supply bus 24 to measure voltage on the power supply bus 24 when the current distributor 22 connects the power supply bus 24 to the most discharged battery. Alternatively separate voltage sensors (not shown) may be used on each charging port.

The apparatus 10 may include a current signal sensor 34 operable to sense current on the power supply bus 24 and operable to produce a current signal for reception at an input 36 of the controller 26.

Figure 3:
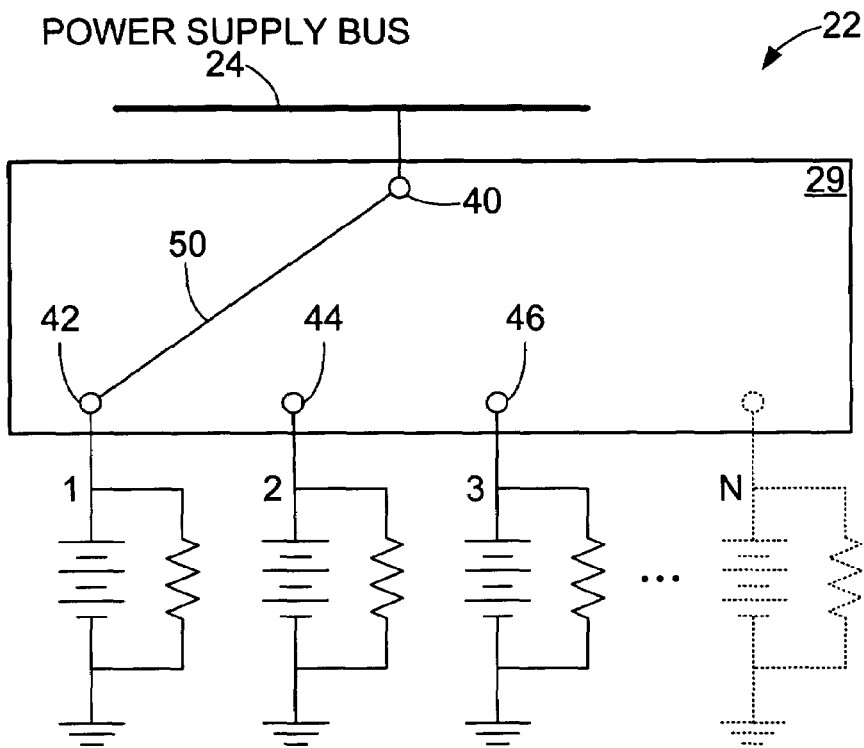
FIG. 3 is a schematic representation of a first embodiment of a current distributor shown in FIGS. 1 and 2.

Referring to FIG. 3, the charge current distributor 22 may include a switching circuit 23 implemented as a single pole multi-throw switch having a common contact 40 connected to the power supply bus 24 and having a plurality of port contacts, three of which are shown at 42, 44, and 46, defining three battery charging ports operable to be selectively connected to the positive terminals of respective batteries 12, 14 and 16 or battery banks of the battery system 11. The charge current distributor 22 may have contacts defining any number of battery charging ports. The single pole multi-throw switch also has a wiper 50 operable to selectively connect the common contact 40 to any of the port terminals 42, 44, and 46. The switching circuit may be implemented by any type of actuated contact device such as a rotary switch, for example, driven by a stepper motor (not shown) controlled by the control signal produced by the controller 26 shown in FIG. 2.

Figure 4:
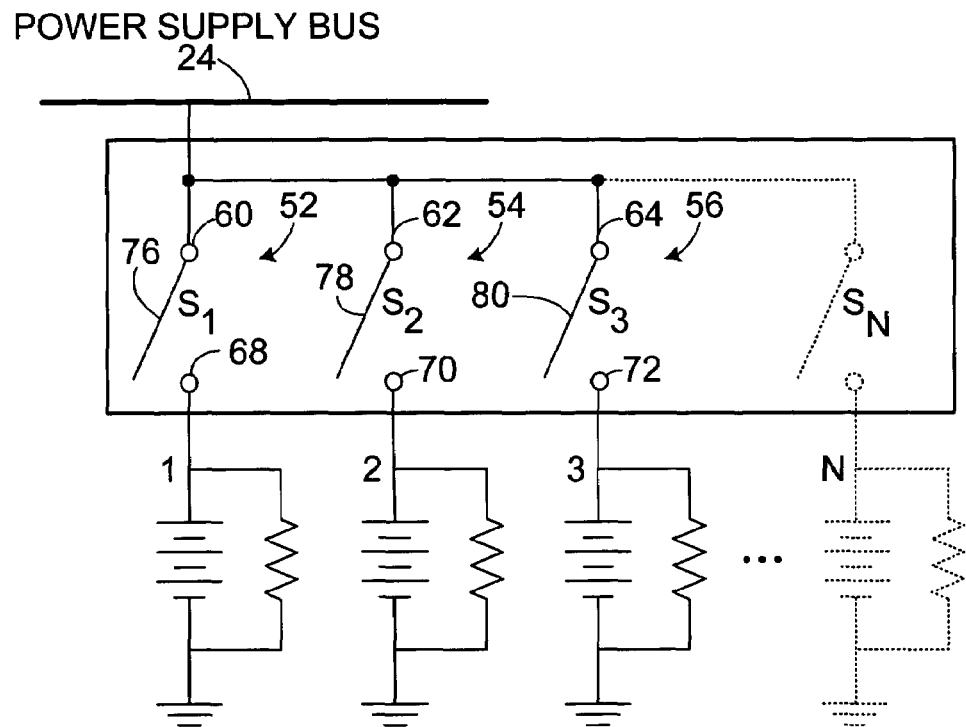
FIG. 4 is a schematic representation of a second embodiment of a current distributor shown in FIGS. 1 and 2.

Alternatively, referring to FIG. 4, the charge current distributor 22 may include a switching circuit implemented by a plurality of single pole, single throw switches, three of which are shown at 52, 54, and 56, each having a first terminal 60, 62, and 64, respectively, connected to each other and to the power supply bus 24. Each switch 52, 54, and 56 also has a respective second terminal 68, 70, and 72 acting as a port terminal to which a respective positive terminal of a battery or battery bank may be connected. Each switch 52, 54, and 56 also has a respective wiper 76, 78, and 80 selectively operable to connect its associated respective common terminal 60, 62, and 64 to a respective port terminal 68, 70, and 72. The embodiment shown in FIG. 4 may be realized by employing a plurality of single pole, single throw relays (not shown), the coils of the relays being selectively activated in response to the control signal produced by the controller 26. Alternatively, the embodiment shown in FIG. 4 can employ the switching circuit described below relative to FIG. 5 or other conventional semiconductor switches. Herein, the term "control signal" refers to any signal or collection of signals activated or modulated in any manner determined by the specific implementation of the current distributor 22 under consideration to permit the controller 26 that produces the control signal to selectively connect ports of the current distributor 22 to which batteries or battery banks are connected to the power supply bus 24.

Figure 5:
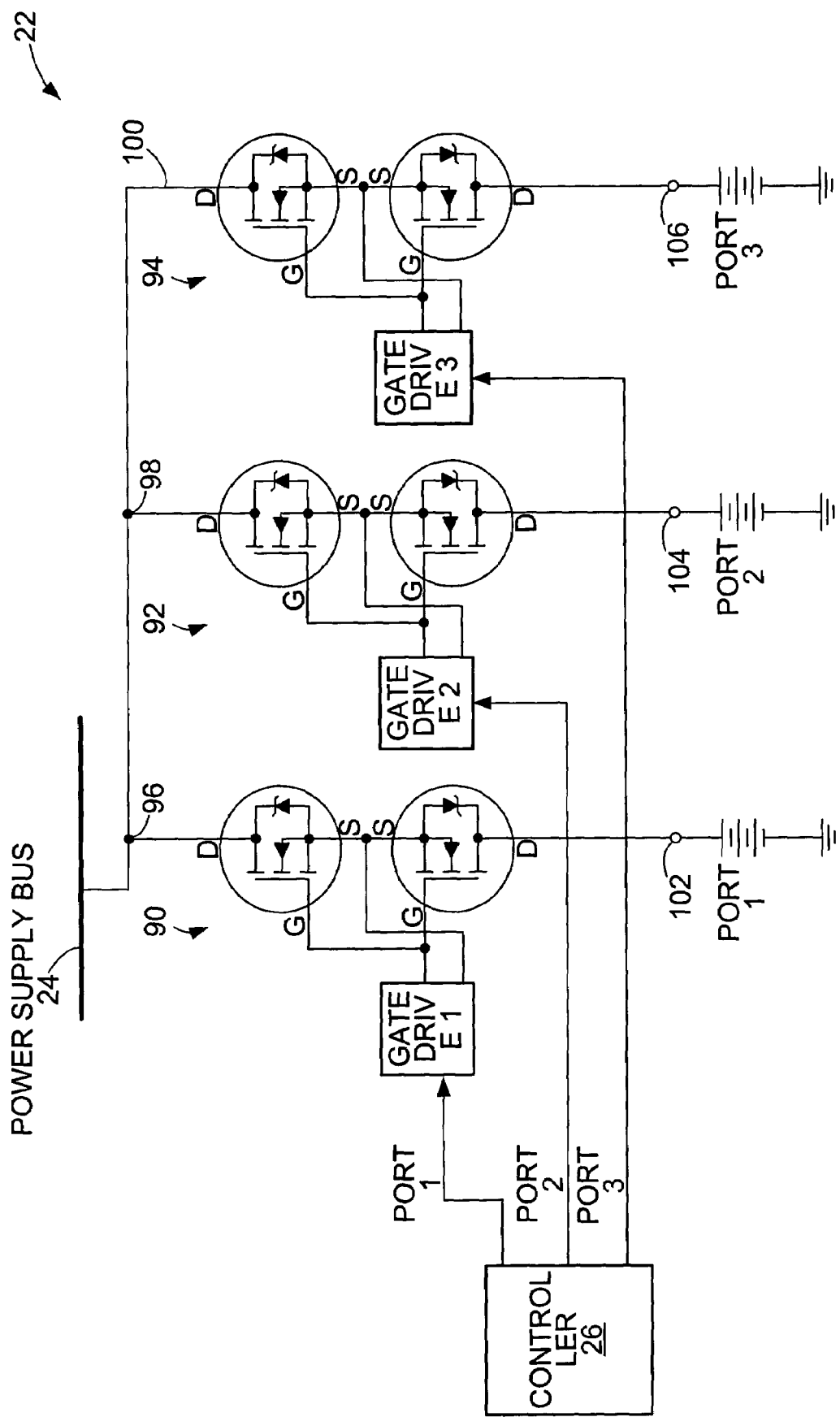
FIG. 5 is a third embodiment of a current distributor shown in FIGS. 1 and 2.

Referring to FIG. 5, in a further alternative implementation, the current distributor 22 may include a switching circuit implemented by a plurality of semiconductor branch circuits shown generally at 90, 92 and 94. Each branch circuit 90, 92 and 94 has a respective common terminal 96, 98, and 100 connected to the power supply bus 24 and each branch circuit has a respective port terminal 102, 104 and 106 to which the positive terminals of respective batteries or battery banks of the battery system 11 may be connected.

Figure 6:
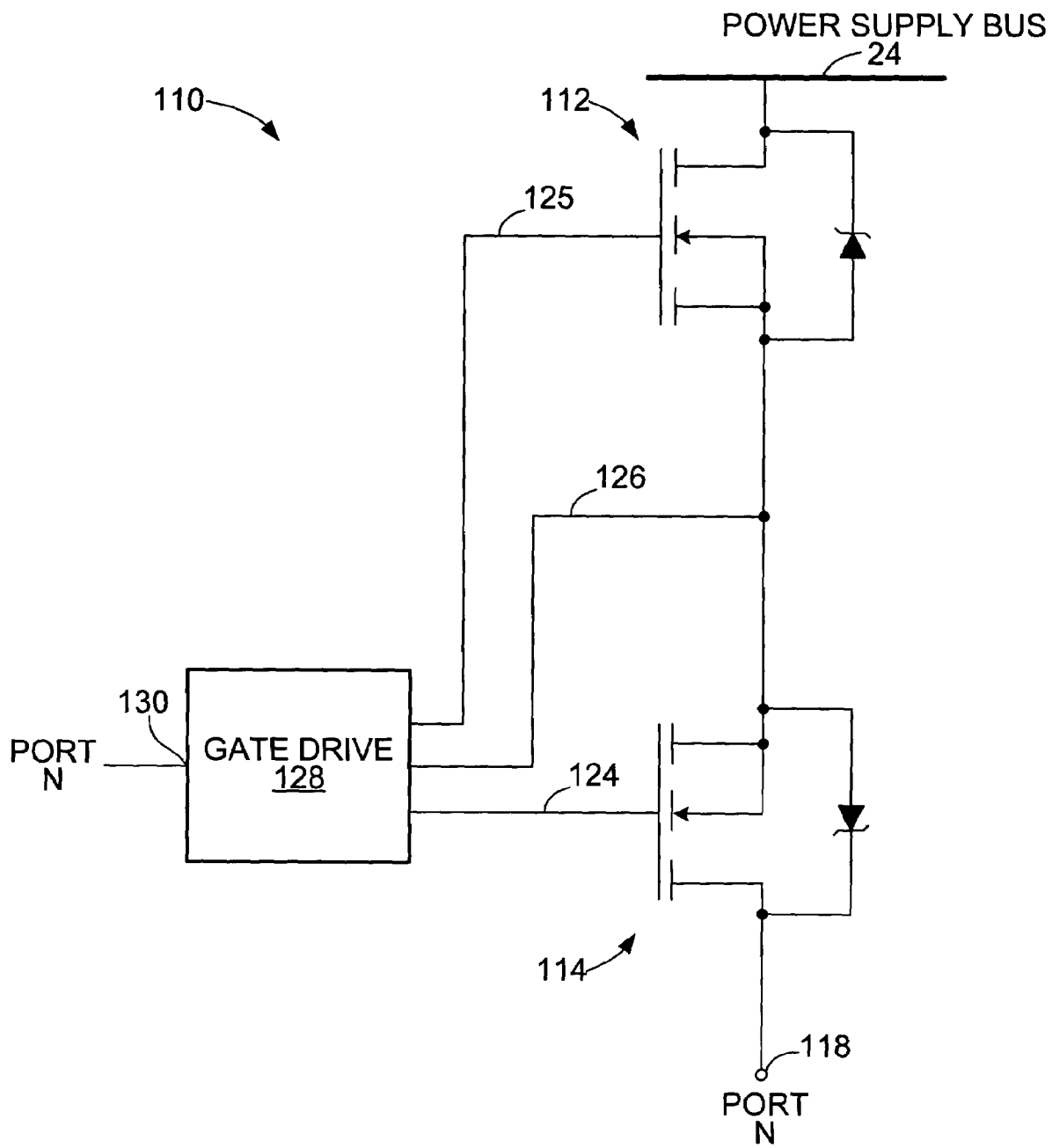
FIG. 6 is a schematic representation of a branch circuit of the current distributor shown in FIG. 5.

Referring to FIG. 6, a representative branch circuit of the type shown in FIG. 5 is shown generally at 110 and includes first and second metallic oxide semi-conductor field effect transistors (MOSFETS) 112 and 114 connected in an anti-series totem pole arrangement between the power supply bus 24 and a port terminal 118. This arrangement permits blocking of reverse current through the MOSFET body diode which inherently provides for reverse battery polarity protection. The MOSFETS 112 and 114 are driven by gate drive signals on respective conductors 124 and 125. The gate drive signals are provided by a gate drive unit 128 which produces the gate drive signals in response to a control signal received at a control signal input 130 from the controller 26. The gate drive signals are referenced to a reference point between the MOSFETS 112 and 114, which is connected to the gate drive unit 128 by a conductor 126. When the control signal is active, the gate drive unit 128 produces gate drive signals that turn on both MOSFETS 112 and 114 to provide a very low resistance conducting path between the power supply bus 24 and the port 118. Similarly, when the control signal received at the gate drive unit 128 is inactive, both MOSFETS 112 and 114 are turned off, thus preventing any flow of current from the power supply bus 24 to the corresponding port 118. Alternative implementations of the current distributor can be provided by replacing MOSFET 112 with a diode, or alternative semiconductor devices such as Bipolar Junction Transistors (BJTs) could be used. If reverse polarity protection is not desired, and only small differences in voltages between banks are expected (less than a diode voltage drop), then MOSFET 112 may be omitted and MOSFET 114 may be connected between the power supply bus 24 and the port 118. Alternatively a bipolar junction transistor could be substituted for MOSFET 112 and directly connected to the port with (or without) a series diode. These alternative implementations may not provide complete bi-directional isolation of ports (118, 102, 104, or 106) from the power supply bus 24, over a full range of system voltage conditions, however.

Figure 7:
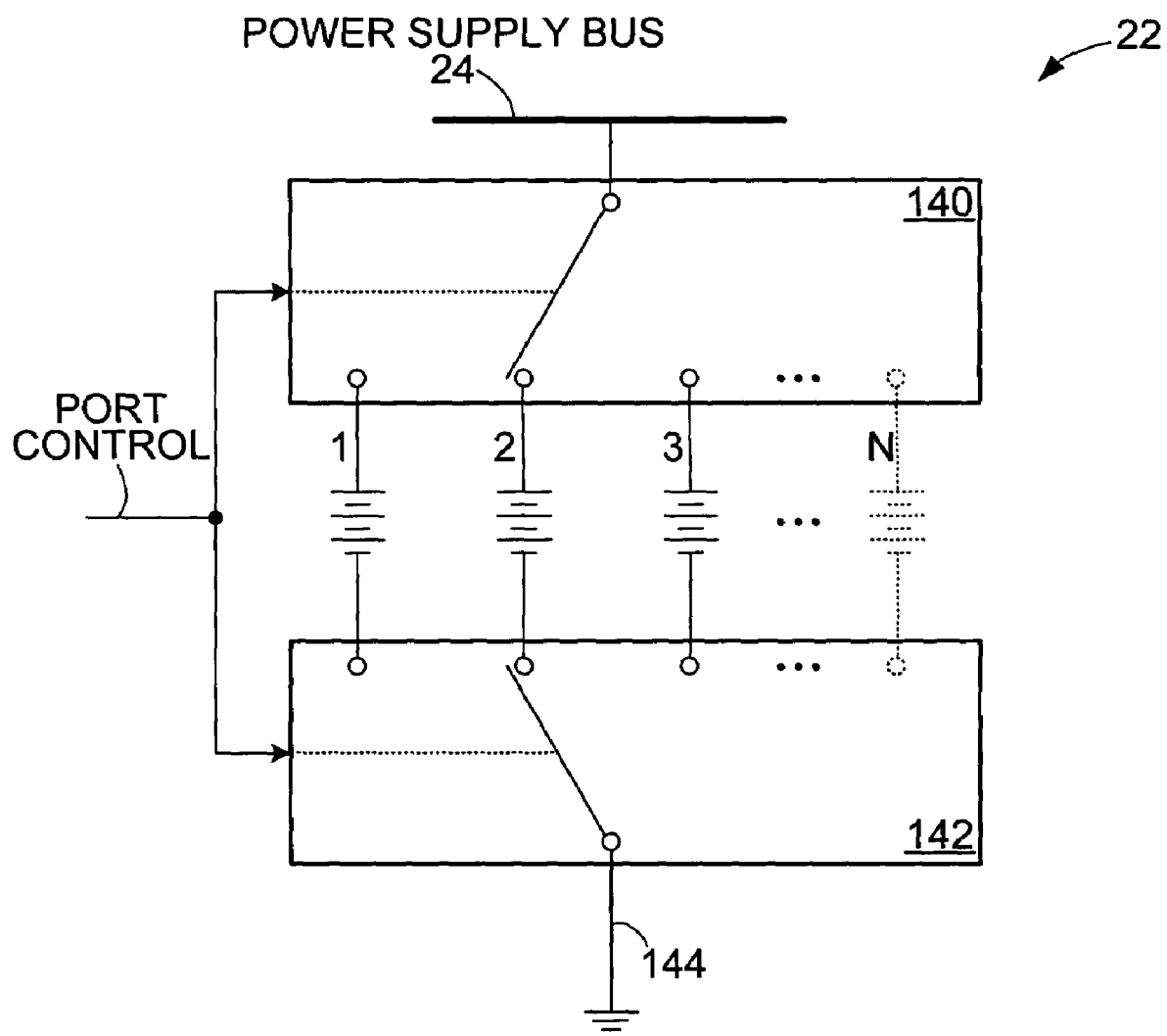
FIG. 7 is a fourth embodiment of a current distributor shown in FIGS. 1 and 2.

Referring to FIG. 7, in another implementation of the charge current distributor 22, the charge current distributor comprises first and second switching circuits 140 and 142, each of which may include any of the switching circuits shown in FIGS. 3–5. Each switching circuit 140 and 142 is used to selectively connect respective poles of a battery or battery bank to the positive pole of the power supply 20 and to a common reference conductor 144 to which a negative pole of the power supply 20 is connected. This embodiment employing two switching circuits may be used where each battery or battery bank is electrically isolated.

Figure 8:
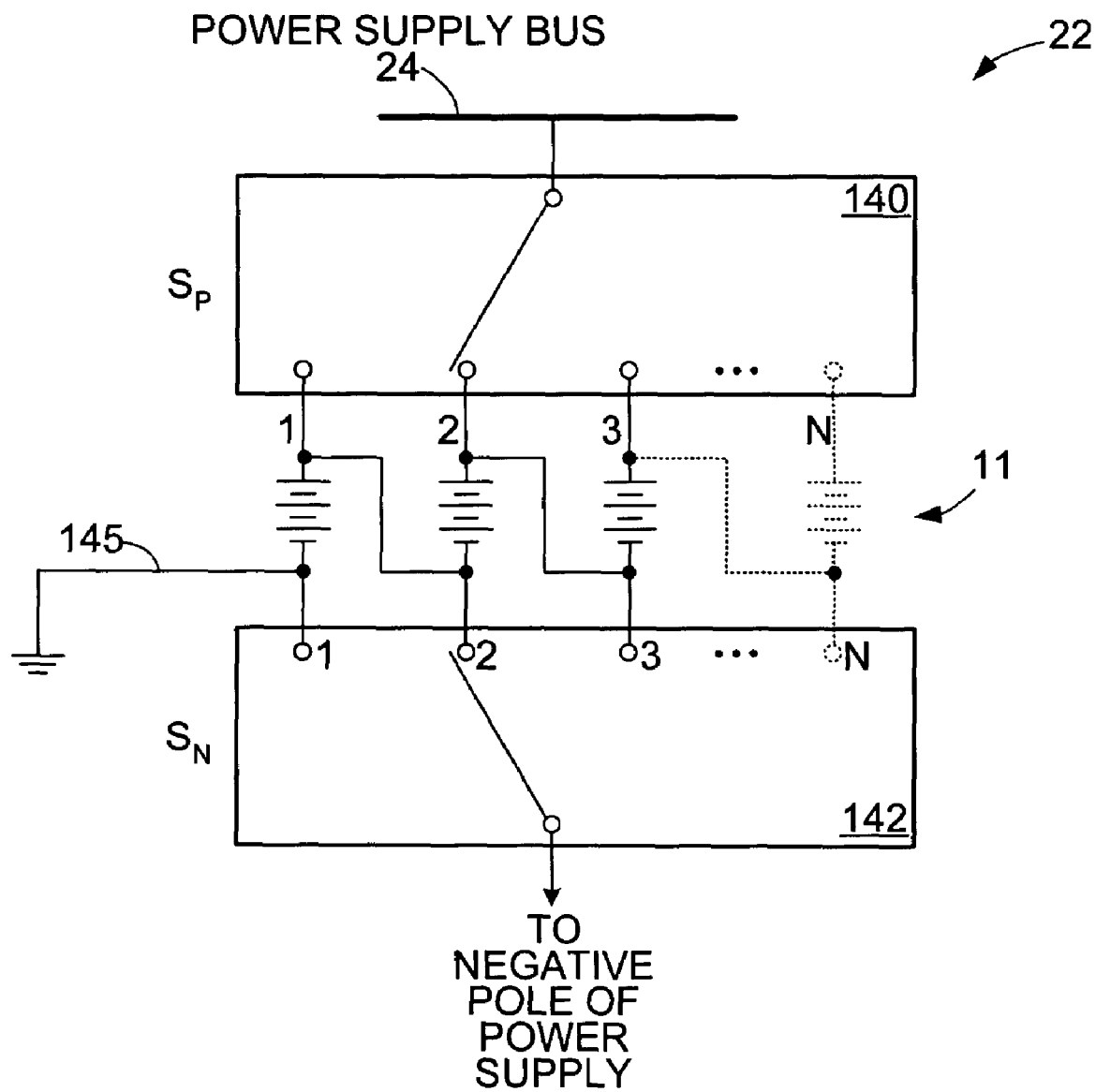
FIG. 8 is a fifth embodiment of a current distributor shown in FIGS. 1 and 2.

Referring to FIG. 8, the embodiment shown in FIG. 7 may alternatively be used where the batteries or battery banks are connected in series. In this embodiment, care must be taken to ensure that the negative pole of the power supply 20 is not connected to a negative pole 145 of the battery system 11 to ensure that when the second switching circuit 142 is connected to any battery other than the battery on port 1, in the embodiment shown, a short circuit does not occur.

In general the switching circuits shown in FIGS. 3–5, 7, or 8 may be used to connect the most discharged battery to at least one pole of the power supply 20.

Figure 9:
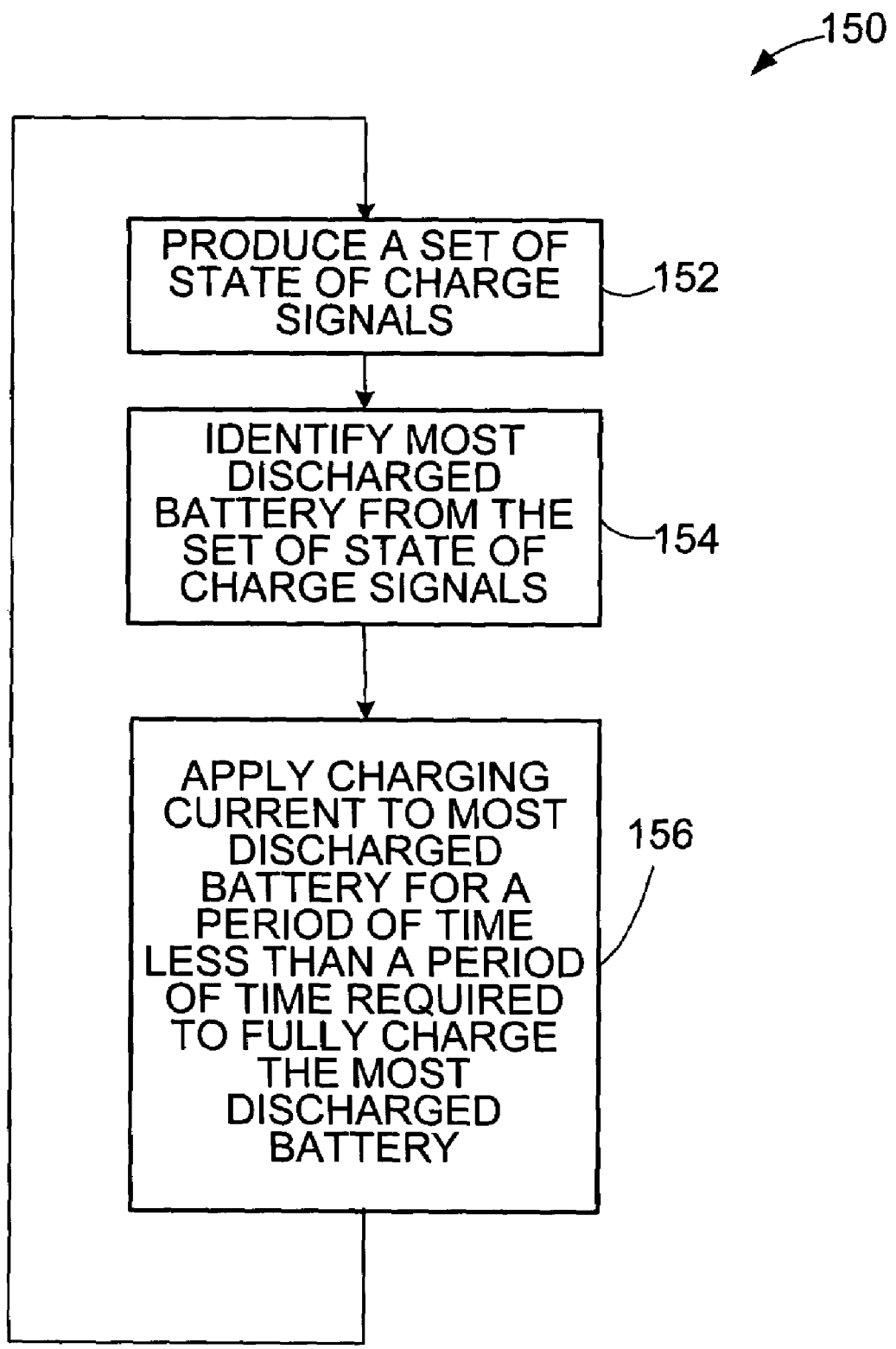
FIG. 9 is a flowchart of a method according to a first embodiment of the invention.

Referring to FIG. 9, a method carried out by the apparatus 10 shown in FIG. 1 and the apparatus 27 shown in FIG. 2 is shown generally at 150 and involves a first action 152 wherein the apparatus produces a set of state of charge signals representing the state of charge of each battery or battery bank in the battery system. The method further includes action 154 wherein the apparatus identifies the most discharged battery from the set of state of charge signals. The method further includes action 156 in which a charging current is applied to the most discharged battery for a period of time less than a period of time required to fully charge the most discharged battery. On completion of action 156, the apparatus repeats the actions shown in FIG. 9 and produces another set of state of charge signals (block 152), identifies from that set the most discharged battery (block 154) and applies charging current to the most discharged battery for a period of time less than a period of time required to fully charge the most discharged battery (block 156). Alternatively state of charge signals may continually be produced and the most discharged battery identified therefrom after a charging current has been applied to the previously identified most discharged battery. Thus, in general the method involves producing sets of state of charge signals indicative of the states of charge of each battery in the system, successively identifying from the state of charge signals the most discharged battery in the system and applying a charging current to the most discharged battery for a first period of time less than a period of time required to fully charge the most discharged battery, before identifying a succeeding most discharged battery in said system.

The effect of this method is to cause the most discharged battery or battery bank in the system to be charged first or at least up until its state of charge is in a range of or exceeds that of the next most discharged battery or battery bank in the system. Then, the effect of the method is to charge the two batteries or battery banks exhibiting this next higher state of charge, somewhat alternately, until the state of charge of at least one of the two batteries being alternately charged exceeds the state of charge of the battery or battery bank in the system exhibiting the next higher state of charge. Then, the three batteries or battery banks exhibiting generally this next most discharged state of charge are alternately charged until the state of charge of at least one of these three batteries or battery banks exceeds the state of charge of the next most discharged battery or battery bank in the system, and so on. In this manner, a charging sequence is established whereby the most discharged battery or battery bank receives charging current first, and batteries or battery banks are added to the sequence in order of increasing state of charge, until all batteries or battery banks in the system are charged to approximately the same level. More generally, a dynamic charging sequence is established in which batteries or battery banks are added to the charging sequence in order of increasing state of charge as batteries or battery banks already in the charging sequence are charged to exceed the state of charge of a battery or battery bank having the next higher state of charge relative to the state of charge of the batteries or battery banks already in the charging sequence.

The charging sequence produced by the apparatus and methods described herein is particularly suited to use with flooded lead acid-type batteries, for example, as such batteries should not remain at a low state of charge for a long period of time and are prevented from doing so since the battery or battery bank with the lowest state of charge is considered the most important battery to charge first and this minimizes the time during which that battery is deprived of its full state of charge, before the next most discharged battery is added to the charging sequence.

Referring back to FIG. 2, to implement the methods described herein in the embodiment shown, the controller 26 includes a processor circuit 160 in communication with an (input/output) I/O port 162 and in communication with random access memory (RAM) 164 and program memory 166. The I/O port 162 is operable to receive signals from the voltage sensor 28 and from the current signal sensor 34. In this embodiment, the I/O port 162 also includes outputs 168 and 170 for supplying a reference current signal and a reference voltage signal, respectively, to the power supply 20. The reference current signal determines the maximum current output of the power supply 20 and the reference voltage signal specifies a regulated voltage of the power supply when the power supply is operating at less than its maximum current value.

In this embodiment, the program memory 166 may include memory on an integrated circuit containing the processor circuit 160 or it may include a separate chip, such as an electrically erasable programmable read only memory, for example. The program memory 166 is programmed with codes for directing the processor circuit 160 to control the charge current distributor 22 in response to the states of charge of the batteries, as represented at least by the signal from the voltage sensor 28, to carry out the method described above with reference to FIG. 9.

Figure 10:
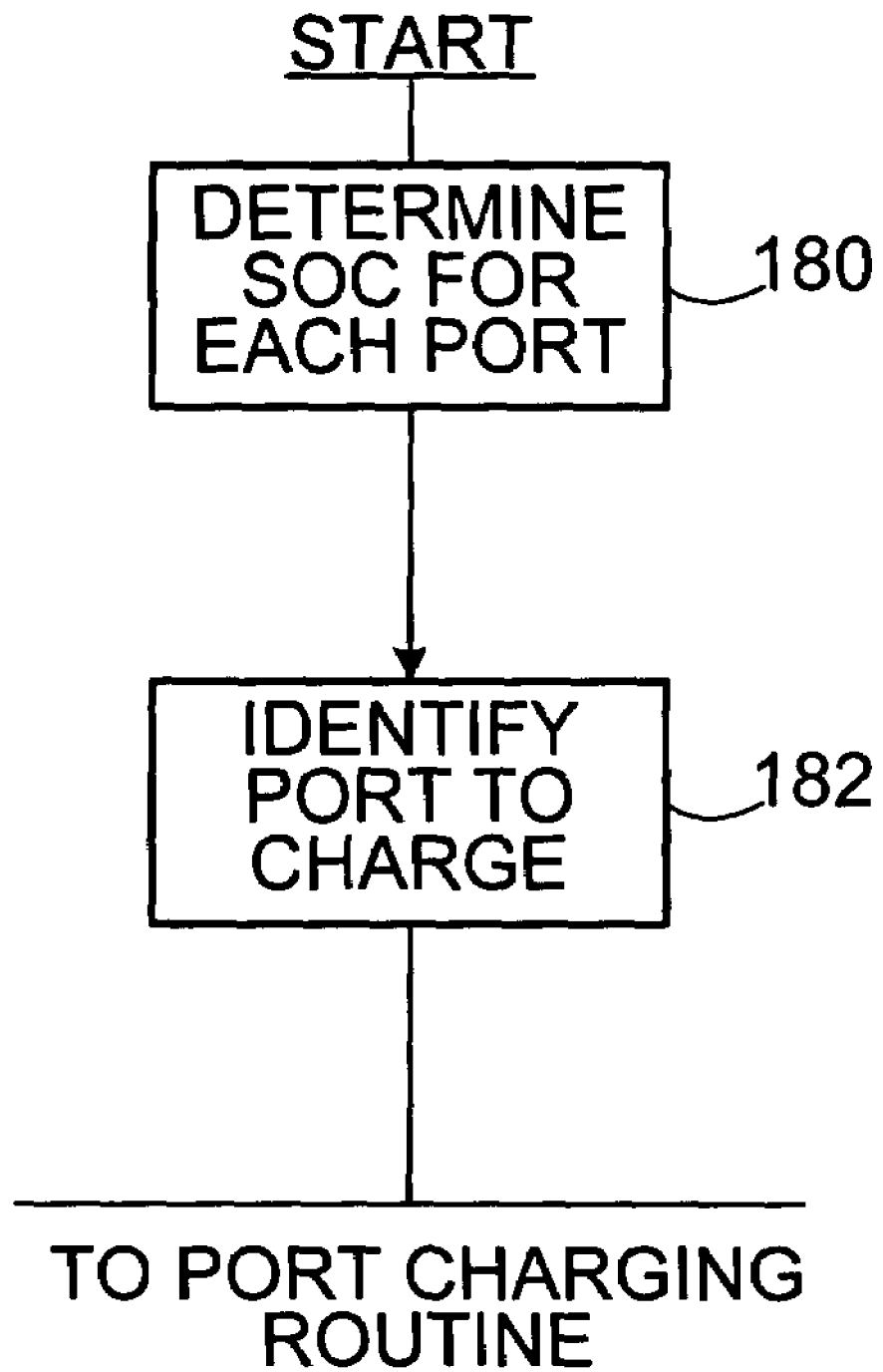
FIG. 10 is a flowchart of codes executed by a processor in FIG. 2 to carry out blocks 152 and 154 of the method shown in FIG. 9.

Referring to FIGS. 2 and 10, in this embodiment, the program memory 166 is loaded with a first block of codes represented by block 180 that direct the processor circuit 160 to start a charging process by communicating with the I/O port 162 to produce current and voltage reference signals on outputs 168 and 170 to cause the power supply 20 to reduce its output current and voltage to zero and to cause it to effectively be isolated from the power supply bus 30. In this embodiment, the processor circuit 160 sets the current and voltage reference signals to zero and in response the power supply 20 is de-energized.

In addition, block 180 also includes codes that direct the processor circuit 160 to cause control signals to be produced for receipt by the charge current distributor 22 to cause the charge current distributor to successively connect each port to the power supply bus 24. While a given port is connected to the power supply bus 24, the block 180 directs the processor circuit 160 to read the voltage signal produced by the voltage sensor 28 to measure the voltage of the battery or battery bank connected to the currently connected port. In this embodiment, the voltage signal is considered to be a signal representing the state of charge of the battery or battery bank connected to the port. A digital representation of the voltage signal is saved in the RAM 164 and is associated with a corresponding port identifier. Then the next port is connected and a corresponding voltage measurement is taken and stored as described above. This process of connecting and measuring voltage is repeated for each port until a set of voltage measurements is produced. This set of voltage measurements acts as a set of signals representing the states of charge of the batteries or battery banks in the battery system 11.

Alternatively, separate voltage sensors (not shown) may be used on each part to continuously or independently produce a set of voltage measurements that can be used by the following block 182 in the process.

After a set of signals representing the states of charge of the batteries or battery banks in the system has been acquired and stored in the RAM 164, block 182 directs the processor circuit 160 to sort the voltage values in ascending order to determine the voltage measurement having the lowest value.

Alternatively, in the case where voltage measurements are taken at the beginning of each charging cycle as each voltage measurement is taken, it may be compared to a currently stored voltage measurement and the currently stored voltage measurement may be replaced with the lowest voltage measurement of the comparison. In this manner, the lowest voltage value of each successive measurement is determined as the voltage at each successive port is measured. Nevertheless, as will be seen below, it may be desirable to store a complete set of voltage measurements for the batteries or battery banks for future use.

In the embodiments described herein, the voltage measurement having the lowest value is considered to be associated with the battery or battery bank that is in the lowest state of charge, i.e., the most discharged battery or battery bank.

The port associated with voltage measurement having the lowest value is therefore identified as the port to charge by associating a charge flag in the RAM 164, for example, with that port.

Figure 11:
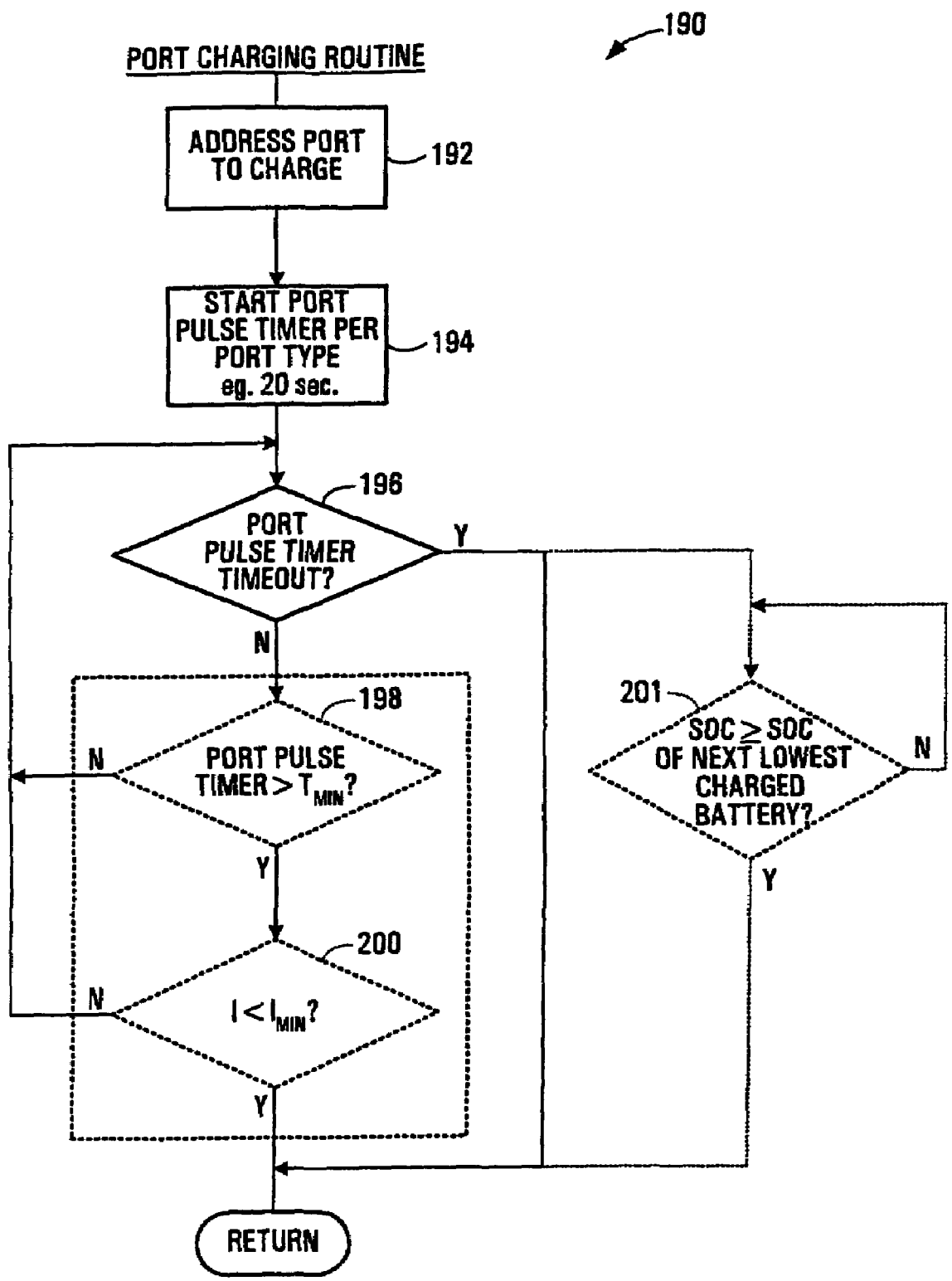
FIG. 11 is a flowchart of a port charging routine executed by the processor circuit shown in FIG. 2 to carry out block 156 of the method shown in FIG. 9.

Referring to FIG. 11, after identifying the port to charge, a port charging routine as shown generally at 190 is executed by the processor circuit 160. The port charging routine 190 includes a first block of codes 192 that directs the processor circuit 160 to cause the I/O port 162 to produce a control signal that causes the current distributor 22 to connect the identified port associated with the most discharged battery to the power supply bus 24 to begin charging the battery or battery bank connected to the identified port. Then, block 194 directs the processor circuit 160 to implement and start a port pulse timer according to the port type. Where the port is to be used to charge a flooded lead acid battery, the port type is "flooded lead-acid" and the port pulse timer may be set to provide a first time period that may be fixed or programmable. RAM 164 may store user input, such as port type, to determine the first time period.

The first time period is selected so that the battery being charged is able to receive sufficient current such that it is able to increase or maintain its current state of charge even with a load connected thereto. The ability of the battery to increase or maintain its state of charge depends upon the charge acceptance or coulombic charge efficiency of the battery, which depends upon the chemical type of the battery or battery chemistry and state of charge (SOC). In a flooded lead-acid type of battery, the charge acceptance of the battery is dependent upon the current state of charge of the battery, i.e., whether the state of charge will permit the battery to accept bulk charging, absorption charging or float charging current. In addition within each of these phases the ability of the battery to accept charge depends upon how long a charging current has been supplied. For example, the charge acceptance of a flooded lead-acid type battery in any charging phase is greater upon initial application of a charging current than some time after the charging current has been applied. In other words, the charge acceptance of the battery decreases from an initial value, over time, while charging current is applied to the battery.

To allow for different levels of charge acceptance in the different phases of battery charging and to allow for user-applied DC loads which may be or may become present while charging, in the embodiment described, the first time period is selected such that over a plurality of first time periods the battery receives a net charge gain or at least is able to maintain its present charge state. For a flooded lead acid battery, for example a net charge gain is desired during the bulk and absorption phases of charging and maintaining a current state of charge is desirable during the float phase of charging. If a single first time period is to be used in each of these phases, the first time period must be selected such that when a maximum expected load is applied to the battery during charging, a net state of charge gain is seen at the battery during the bulk and absorption phases and maintenance of the current state of charge of the battery is seen during the float phase. Alternatively, different first time periods may be used in corresponding phases or groups of phases, for example. The controller may use current and voltage measurements, for example, to determine the current charging phase of the battery and select an appropriate first time period accordingly.

For a flooded lead-acid battery, a suitable first time period may be determined empirically by measuring the average long-term steady state of charge of the battery after applying the charging methods described herein with different first time periods and different loads connected to the battery and selecting as a desirable first time period the one that permits a net state of charge gain during the bulk and absorption phases of charging and that maintains a state of charge of the battery during the float phase. Results have shown that a first time period of between about 1 and about 30 seconds and more particularly about 20 seconds is suitable for a 200 Amp-Hour Deep Cycle flooded lead-acid battery at about 20 degrees Celsius bearing a user-connected load of approximately 10 Amps.

Since charge acceptance drops with time, relatively short first time periods are desirable, however, it may be desirable to ensure that resulting current and/or voltage fluctuations appearing at the battery do not interfere with loads that may be connected to the battery. Time periods under about 1 second in a two battery system may cause a perceptible flicker in lighting circuits connected to one or the other of the batteries. Time periods on the order of milliseconds can cause transients to appear at the battery and such transients may create interference with electronic equipment connected to the battery being charged such as a perceptible buzzing sound in poorly filtered audio systems. Time periods on the order of microseconds or even shorter time periods can cause radio frequency interference. Thus it is desirable to ensure the first time period is long enough to avoid electrical interference resulting in effects that are perceptible by humans in loads connected to the battery or battery bank being charged and to avoid un acceptable radio frequency disturbances.

Still referring to FIG. 11, after block 194, block 196 directs the processor circuit 160 to determine whether the port pulse timer has timed out or is still activated. If it has timed out, a cycle of the charging process defined between blocks 180 and 196 is considered to be completed and the processor circuit 160 is directed back to block 180 shown in FIG. 10 where it begins another cycle of the charging process, as described above.

During the time period in which a battery or battery bank is being charged, the controller 26 may monitor the voltage and current applied to the battery and adjust the Vref and Iref values accordingly to maximize charging efficiency depending on the ability of the battery or battery bank to accept charge as indicated by the monitored voltage and current. Selectable charging profiles may be entered by the user and stored in RAM 164, or non-volatile memory (not shown), accessible by the processor circuit 160, or predefined profiles may be stored in any memory accessible by the processor circuit 160. The controller 26 may provide optimum charging efficiency by controlling the power supply 20 to produce a charging current according to the charging profile associated with the most discharged battery connected to the identified port.

Enhancements

The charging process may be enhanced by including within the port charging routine 190 a test relating to the current supplied to the battery or battery bank being charged.

For example, the processor circuit 160 may be programmed with blocks of codes 198 and 200 for directing it to implement a current criteria test to determine whether or not the current supplied to the battery or battery bank being charged rapidly falls off within a period of time within the first period of time. Such a rapid falling off of charging current would be typical of a lead-acid battery in the absorption phase, for example. Typically in this phase, the current supplied to the battery or battery bank will be very high initially but will drop off exponentially over a very short time. Typically this very short time is within the first period, i.e., much less than the approximately twenty seconds described above and may be on the order of about one to five seconds, for example. It is desirable, however, to minimize the effect of transient currents on loads connected to the battery, to ensure that the battery is exposed to a charge current pulse of a minimum time duration such as one second, for example. Thus, block 194 may also include codes that implement a minimum period timer and block 198 may direct the processor circuit 160 to determine whether or not a minimum time period has passed since the first period timer was set. This minimum period may be subject to the same constraints as the minimum time for the first period, for example, in a marine application, where it is desirable to avoid unwanted interference in loads connected to the battery being charged. In a marine application with a flooded lead acid battery, the minimum time period may be between about 1 second and about 5 seconds, for example.

If at block 198 the minimum time period has not elapsed, no action is taken and the processor circuit 160 is directed back to block 196. If the minimum time period has passed, the processor circuit 160 is directed to the second set of codes 200 which causes it to determine whether or not, after the above described minimum time period and before the expiry of the first time period, the current supplied to the battery or battery bank currently being charged is less than a threshold level. If it is not, then no action is taken and the processor circuit 160 is directed back to block 196. If the current supplied to the battery or battery bank is less than the threshold level, the processor circuit 160 is directed back to block 180 shown in FIG. 10 to begin another charging cycle without completing the first time period. In general it will be appreciated that effectively, the most discharged battery is disconnected from the power supply during the first period of time when the charge current meets a first criterion being that the charge current is less than a threshold value after a minimum period of time, within the first period of time, in this embodiment.

Optionally, to reduce time taken to check the states of charge of all of the batteries or battery banks when the state of charge of the battery exhibiting the lowest state of charge is significantly different from the state of charge of the battery or battery bank having the next higher state of charge, block 201 may be included in the "yes" path from block 196 to direct the processor circuit 160 to monitor the state of charge of the battery or battery bank being charged to determine whether it is equal to or exceeds the state of charge of the battery or battery bank exhibiting the next higher state of charge. This may be achieved by monitoring the voltage at the power supply bus 24 which is indicative of the voltage at the battery or battery bank being charged, and comparing it to the voltage measurements in the set of voltage measurements taken during the last execution of block 180. When the present voltage measured at the power supply bus 24 (representing the state of charge of the battery being charged) is equal to or greater than the next higher voltage measurement in the last-acquired set of voltage measurements, block 201 causes the processor circuit 160 to continue charging the battery or battery bank currently being charged. When the voltage measured at the power supply bus 24 is equal to or greater than the next higher voltage measurement in the last-acquired set of voltage measurements the processor circuit 160 is directed to end the port charging routine and return to block 180 in FIG. 10 to begin another charging cycle. In this manner, the battery or battery bank exhibiting the lowest state of charge is continuously charged until its state of charge exceeds the next higher state of charge in the battery system whereupon the battery associated with the next higher state of charge is then also subjected to charging.

Active Port Detection

Referring to FIG. 2, it will be appreciated that the charge current distributor 22 has a plurality of ports. However, not every port may have a battery connected to it. The routines shown in FIGS. 12 and 13 may be included in the program memory 166 along with those shown in FIGS. 10 and 11 to cause the processor circuit 160 to scan the ports so as to determine which ports are "active" ports and which ports are "inactive" ports and to ensure that, during a charging cycle, state of charge signals are only sought from active ports. Active ports are ports which have batteries connected thereto and inactive ports are ports to which no battery is connected, although such ports may have loads connected thereto.

Figure 12:
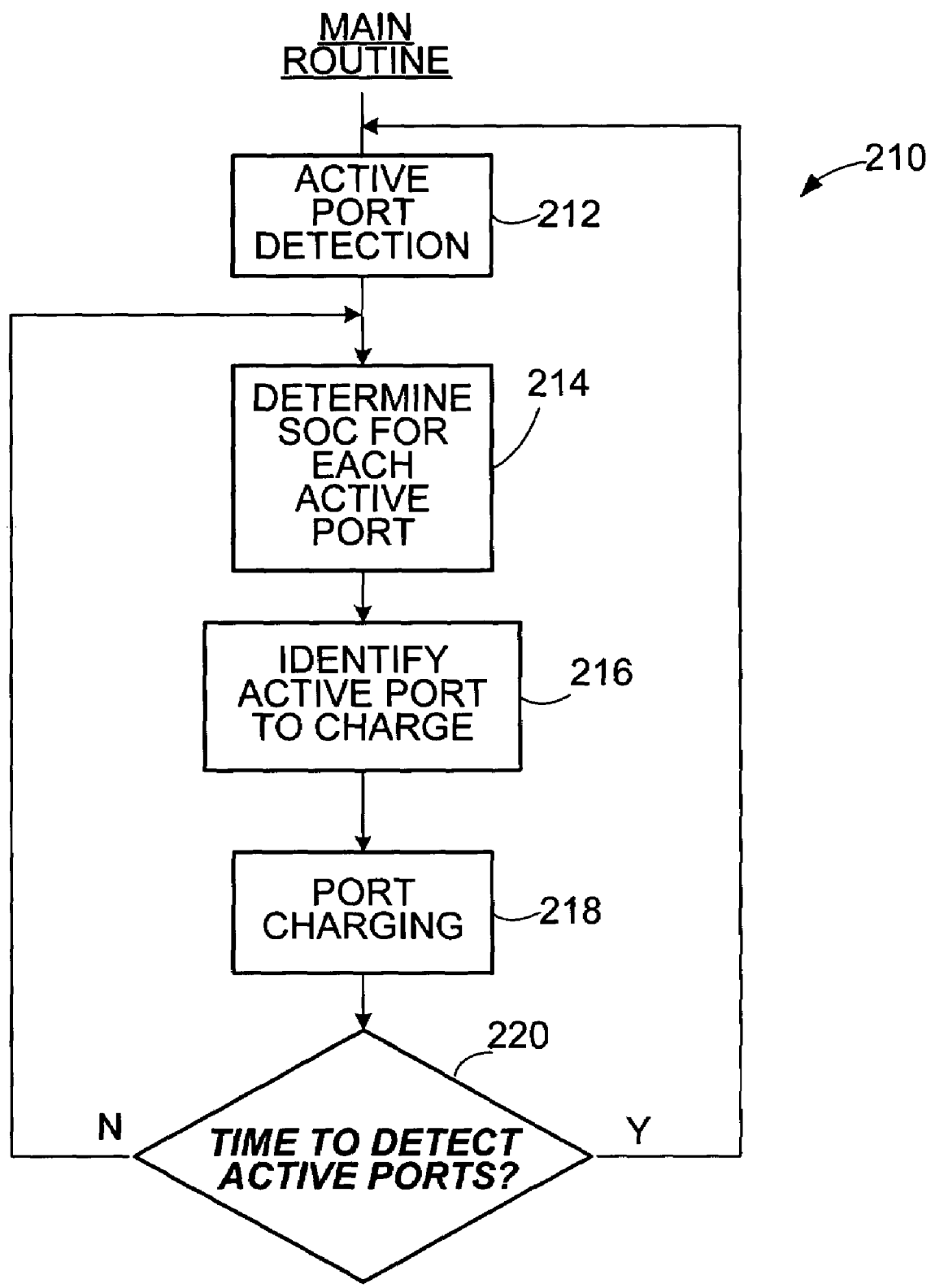
FIG. 12 is a flowchart of a main routine executed by the processor of FIG. 2, including an active port detection routine for detecting which of a plurality of ports of the current distributor shown in FIG. 2 has a battery or battery bank connected thereto.

Referring to FIGS. 2 and 12, in this embodiment and to provide for detection of active and inactive ports, the program memory 166 includes codes that implement a main routine 210 as shown in FIG. 12. The main routine includes an active port detection block 212; a block 214 similar to block 180 shown in FIG. 10, which directs the processor circuit 160 to determine the state of charge for each active port; a block 216 similar to block 182, which directs the processor circuit 160 to identify an active port to charge; and includes block 218 which is the same as the port charging routine 190 shown in FIG. 11, with or without the optional current test blocks 198 and 200. Finally, the main routine 210 includes block 220 which directs the processor circuit 160 to determine whether or not it is time to detect active ports. If it is not time to detect active ports, the processor circuit 160 is directed to block 214 to resume processing as shown, or if it is time to detect active ports, the processor circuit 160 is directed to block 212 where it again performs an active port detection function.

At block 220, where the processor circuit 160 determines whether or not it is time to detect active ports, a separate timer (not shown) may be maintained by the processor circuit 160, the separate timer marking time periods of about ten minutes, for example, so that about every ten minutes the processor circuit 160 interrupts the charging process and is directed to the active port detection block as shown at 212 in the main routine 210. Otherwise, the processor circuit 160 loops through the blocks shown at 214, 216 and 218 to carry out the charging method shown in FIG. 9.

Figure 13:
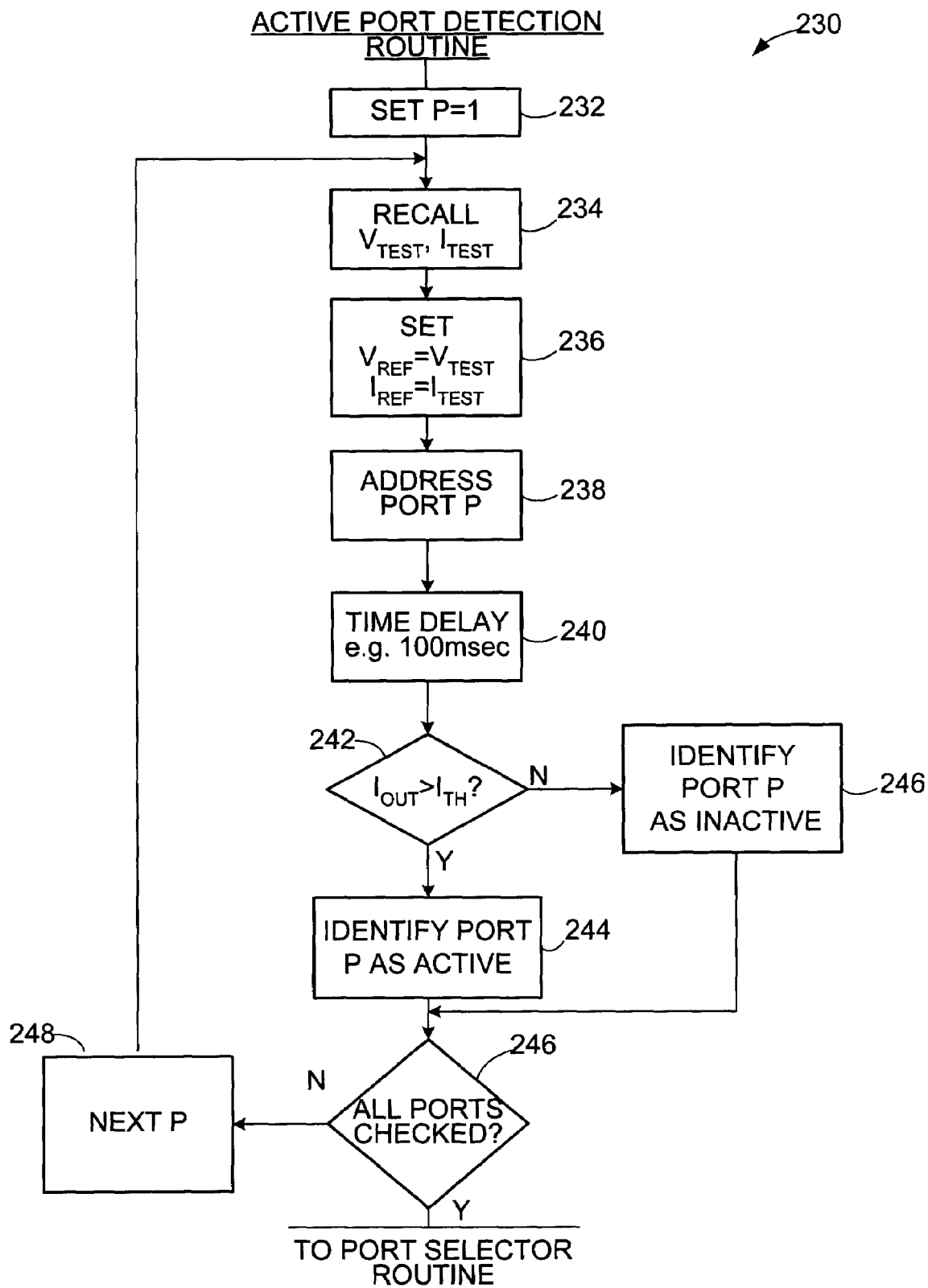
FIG. 13 is a flowchart of the active port detection routine shown in FIG. 12.

Referring to FIG. 13, an exemplary active port detection routine as implemented by the active port detection block 212 shown in FIG. 12 is shown generally at 230. The active port detection routine 230 begins with a first block 232, which directs the processor circuit 160 to set a port counter variable p=1 to identify the first port as the selected port. Then, block 234 directs the processor circuit 160 to recall from RAM 164, for example, or from the program memory 166, a test voltage and a test current for the type of battery connected to the first port. The test voltage and test current may be set by the user and stored in a lookup table, for example, in the RAM 164. Alternatively, these values may be stored in a lookup table, for example, in the program memory 166 as fixed values. It may be desirable to set the test voltage to a value corresponding to the absorption voltage of the battery and to set the test current value to the maximum charging current of the battery.

After recalling the absorption voltage and maximum current for the selected port, block 236 directs the processor circuit 160 to produce a signal for receipt by the power supply 20 causing it to set the reference voltage and reference current to the test voltage and test current values, respectively. This allows limits to be set on the power supply 20 to ensure that excessive voltages and excessive currents are not presented to a battery connected to a port connected to the power supply bus 24, thereby activating port p so as to permit a current to be drawn from port p. Next, block 238 directs the processor circuit 160 to produce control signals to cause the charge current distributor 22 to connect the port identified by the port variable p to the power supply bus 24. Then, block 240 directs the processor circuit 160 to wait for a period of time, for example 100 milliseconds, and then block 242 directs the processor circuit 160 to read the current supplied to the selected port, as indicated by the current sensor 34 and to determine whether or not the current on the power supply bus is greater than a current value. Effectively, blocks 240 and 242 cause the processor circuit 160 to determine whether or not, after a period of time, the current on the power supply bus 24 is greater than a threshold current value. If so, block 244 directs the processor circuit 160 to identify the currently selected port as an active port. If the test at block 242 is negative, block 246 directs the processor circuit 160 to identify the currently selected port as inactive. Identifying a port as active or inactive may simply involve keeping a list of port numbers and associating with the port numbers in the RAM 164 a flag having the value of one or zero to indicate active and inactive, respectively.

After identifying the currently selected port as being either active or inactive, block 246 directs the processor circuit 160 to determine whether or not all of the ports available at the current distributor 22 have been checked and, if not, block 248 directs the processor circuit 160 to set the port variable to the next port in the sequence and the processor circuit 160 resumes processing at block 234 as described above. If all of the ports have been checked, the active port detection routine is concluded and the processor is directed to block 214 of FIG. 12 where it resumes execution of cycles of the charging process.

It should be noted that the active port detection routine includes the time delay provided by block 240 to allow the current supplied by the power supply to settle to a non-transient value. The time required to reach this value and the value itself depend upon the type and magnitude of the load across the battery port being tested. For example, a capacitive load may be connected instead of a battery or battery bank to a part of the current distributor. This may occur where a battery to be charged is removed from a circuit connected to a charging port. This may be a typical occurrence in a marine application for example. It will be appreciated that this embodiment block 240 provides a way of distinguishing between loads and batteries connected to the charging ports. It will be appreciated that more elaborate algorithms for achieving this goal could be employed.

The apparatus and method described herein inherently blocks current flow out of batteries which are not being charged and causes current not to be supplied to batteries or battery banks in a higher state of charge until the states of charge of other batteries in the system are brought up to such levels. The most discharged, or least charged battery is charged first then the next most discharged battery is charged by multiplexing current between the previously least charged battery and the previously next most discharged battery and more and more batteries are charged in this manner until all batteries are fully charged. Thus charging current is focussed on the least charged batteries and the full output of the charger can be focussed on the least charged batteries. This also allows for full control over charging and allows individual charging profiles to be used to charge each individual battery, permitting batteries with different chemistries to be charged by the same charger. In addition, the apparatus and methods described herein permit batteries or battery banks to be added or subtracted from the system, without powering down the charger.

In addition, the charging methods and apparatus described herein are particularly well-suited for use in systems where different types of DC loads may be connected or disconnected across one or more batteries of the system. Charging is still permitted to occur in the presence of user-applied DC loads across a battery or battery bank to be charged.

While specific embodiments of the invention have been described and illustrated, such embodiments should be considered illustrative of the invention only and not as limiting the invention as construed in accordance with the accompanying claims.

What is claimed is:

1. A method of charging batteries in a system of batteries, the method comprising:
   producing a set of state of charge signals indicative of the states of charge of each battery in said system;
   successively identifying, from the state of charge signals, a most discharged battery in said system; and
   applying a pulse of charging current to said most discharged battery for at least part of a first period of time less than a period of time required to charge said most discharged battery up to the same charge as a next most discharged battery in said system before identifying a succeeding most discharged battery in said system.

2. The method of claim 1 wherein producing said set of state of charge signals comprises measuring voltages of the batteries in the system.

3. The method of claim 2 further comprising isolating a power supply from a battery while said voltage of said battery is being measured.

4. The method of claim 3 wherein isolating said power supply comprises providing a signal to a controllable power supply to de-energize said controllable power supply.

5. The method of claim 4 wherein producing said set of state of charge signals comprises successively connecting said power supply bus to each battery in said system and storing voltage measurements of the batteries as said set of state of charge signals.

6. The method of claim 5 wherein identifying comprises determining which battery of said system is associated with a lowest voltage measurement and associating with said battery associated with said lowest voltage measurement an identifier identifying it as said most discharged battery.

7. The method of claim 1 wherein said first period of time is such that at least a current state of charge of said most discharged battery is maintained over time.

8. The method of claim 1 wherein said first period of time is such that at least a current state of charge of said most discharged battery is increased over time.

9. The method of claim 1 wherein said first period of time is long enough to avoid interference in a load connected to said most discharged battery.

10. The method of claim 1 wherein said first period of time is between about 1 and about 30 seconds.

11. The method of claim 1 further comprising selecting said first period of time in response to a chemical type of said most discharged battery.

12. The method of claim 1 further comprising receiving user input defining said first period of time.

13. The method of claim 12 further comprising storing said user input as stored user input.

14. The method of claim 13 further comprising recalling said stored user input to determine said first period of time.

15. The method of claim 1 wherein applying said charging current to said most discharged battery comprises connecting a power supply to said most discharged battery for said first period of time.

16. The method of claim 15 further comprising controlling said power supply to produce said charging current according to a charge profile associated with said most discharged battery.

17. The method of claim 15 wherein applying said charging current comprises activating a first timer for said first period of time, said power supply being connected to said most discharged battery while said first timer is activated.

18. The method of claim 17 further comprising disconnecting said most discharged battery from said power supply during said first period of time if said charge current meets a first criterion during said first period of time.

19. The method of claim 18 wherein said charge current meets said first criterion when said charge current is less than a threshold value after a minimum period of time within said first period of time.

20. The method of claim 19 wherein said minimum period of time is long enough to avoid interference in a load connected to said most discharged battery.

21. The method of claim 19 wherein said minimum period of time is greater than about 1 second.

22. The method of claim 21 wherein said minimum period of time is less than about 5 seconds.

23. The method of claim 22 wherein said first period of time is between about 1 second and about 30 seconds.

24. The method of claim 15 wherein connecting said power supply to said most discharged battery comprises causing a current distributor to connect said most discharged battery to at least one pole of said power supply.

25. The method of claim 24 wherein causing said current distributor to connect said most discharged battery to at least one pole of said power supply comprises activating a switching circuit connected between said at least one pole of said power supply and said most discharged battery.

26. The method of claim 25 wherein activating a switching circuit comprises turning on a semiconductor switch connected between said at least one pole of said power supply and said most discharged battery.

27. The method of claim 15 wherein connecting said power supply to said most discharged battery comprises causing a current distributor to connect said most discharged battery to respective poles of said power supply.

28. The method of claim 27 wherein connecting said power supply to said most discharged battery comprises activating first and second switching circuits connected to respective poles of said power supply and to respective poles of said most discharged battery.

29. The method of claim 28 wherein activating said first and second switching circuits comprises turning on first and second semiconductor switches associated with said first and second switching circuits respectively where said first semiconductor switch is connected between a first pole of said power supply and a first pole of said most discharged battery and wherein said second semiconductor switch is connected between a second pole of said power supply and a second pole of said most discharged battery.

30. The method of claim 1 further comprising maintaining at least part of said charging current to said most discharged battery until the state of charge of said most discharged battery is within a range of the state of charge of a battery in said system having the next higher state of charge relative to the state of charge of said most discharged battery as determined from a last produced set of state of charge signals, before producing a succeeding set of state of charge signals.

31. The method of claim 1 wherein said batteries are connected to respective battery ports of a current distributor having a plurality of battery ports and wherein said method further comprises determining which of said battery ports has a battery connected thereto.

32. The method of claim 31 wherein determining which of said battery ports has a battery connected thereto is successively performed less frequently than a frequency at which said set of state of charge signals is produced.

33. The method of claim 32 wherein said method comprises setting a port detection timer after determining which of said battery ports has a battery connected thereto and re-determining which of said ports has a battery connected thereto when said port detection timer has timed-out.

34. The method of claim 31 wherein determining which of said battery ports has a battery connected thereto comprises scanning said battery ports.

35. The method of claim 34 wherein scanning said battery ports comprises successively activating each of said battery ports and, while a battery port is activated, permitting a current to be drawn from said battery port.

36. The method of claim 35 further comprising determining whether said current to be drawn from said battery port meets a test criterion and identifying said battery port as having a battery connected thereto when said test criterion is met.

37. The method of claim 36 wherein said test criterion is met when said current drawn from said battery port exceeds a threshold current value after a test period of time.

38. An apparatus for charging batteries in a system of batteries, the apparatus comprising:
  a state of charge signal generator operable to produce state of charge signals indicative of the states of charge of each battery in said system;
  a power supply operable to produce a charging current;
  a current distributor operable to selectively connect each battery in said system to said power supply in response to a control signal;
  a controller configured to:

communicate with said state of charge signal generator to successively produce a set of said state of charge signals indicative of the states of charge of each battery in said system;

successively identify, from said set of state of charge signals, a most discharged battery in said system; and produce said control signal to cause said current distributor to selectively connect said most discharged battery to said power supply such that said most discharged battery receives a pulse of said charging current from said power supply for at least part of a first period of time less than a period of time required to fully charge said most discharged battery up to the same charge as a next most discharged battery in said system, before identifying a succeeding most discharged battery in said system.

39. The apparatus of claim 38 wherein said state of charge generator comprises a voltage sensor operable to measure voltages of the batteries in the system.

40. The apparatus of claim 39 wherein said power supply is operable to be isolated from a battery of said system while said voltage of said battery is being measured.

41. The apparatus of claim 40 wherein said power supply is controllable and wherein said controller is configured to provide a signal to said power supply to de-energize said power supply.

42. The apparatus of claim 41 wherein said state of charge signal generator includes said controller, said controller being configured to successively connect said power supply to each battery in said system and to store voltage measurements of the batteries as said set of state of charge signals.

43. The apparatus of claim 42 wherein said controller is configured to determine which battery of said system is associated with a lowest voltage measurement and to associate with said which battery an identifier identifying it as said most discharged battery.

44. The apparatus of claim 38 wherein said first period of time is selected such that at least a current state of charge of said most discharged battery is maintained overtime.

45. The apparatus of claim 38 wherein said first period of time is selected such that at least a current state of charge of said most discharged battery is increased over time.

46. The apparatus of claim 38 wherein said first period of time is selected to avoid interference in a load connected to said most discharged battery.

47. The apparatus of claim 44 wherein said first period of time is selected to avoid interference in a load connected to said most discharged battery.

48. The apparatus of claim 38 wherein said first period of time is between about 1 second and about 30 seconds.

49. The apparatus of claim 38 wherein said first period of time is selected in response to the chemical type of said most discharged battery.

50. The apparatus of claim 38 further comprising a user input port operable to receive user input defining said first period of time.

51. The apparatus of claim 50 wherein said controller is configured to store said user input as stored user input.

52. The apparatus of claim 51 wherein said controller is configured to recall said stored user input to determine said first period of time.

53. The apparatus of claim 38 wherein said controller is configured to control said power supply to cause it to produce said charging current according to a charge profile associated with said most discharged battery.

54. The apparatus of claim 38 wherein said controller is configured to activate a first timer for said first period of time, and cause said current distributor to be operated such that said power supply is connected to said most discharged battery while said first timer is activated.

55. The apparatus of claim 54 wherein said controller is configured to control said current distributor to disconnect said most discharged battery from said power supply during said first period of time if said charge current meets a first criterion during said first period of time.

56. The apparatus of claim 55 wherein said controller is configured to determine said charge current meets said first criterion when said charge current is less than a threshold value after a minimum period of time within said first period of time.

57. The apparatus of claim 56 wherein said minimum period of time is such as to avoid interference in a load connected to said most discharged battery.

58. The apparatus of claim 56 wherein said minimum period of time is greater than about 1 second.

59. The apparatus of claim 58 wherein said minimum period of time is less than about 5 seconds.

60. The apparatus of claim 58 wherein said first period of time is about 20 seconds.

61. The apparatus of claim 53 wherein said power supply includes first and second poles and wherein said current distributor is operable to connect said most discharged battery to said first and second poles of said power supply.

62. The apparatus of claim 61 wherein said current distributor comprises a switching circuit operable to be connected between said at least one of said first and second poles and said most discharged battery.

63. The apparatus of claim 62 wherein said switching circuit comprises a semiconductor switch operable to be connected between said at least one of said first and second poles and said most discharged battery.

64. The apparatus of claim 53 wherein said power supply has first and second poles and wherein said current distributor is operable to separately connect said first and second poles to respective poles of said most discharged battery.

65. The apparatus of claim 64 wherein said current distributor comprises first and second switching circuits operable to be connected to said first and second poles respectively of said power supply and to respective poles of said most discharged battery.

66. The apparatus of claim 65 wherein said first and second switching circuits comprise corresponding first and second semiconductor switches, said first semiconductor switch being operable to be connected between said first pole of said power supply and a first pole of said most discharged battery and said second semiconductor switch being operable to be connected between a second pole of said power supply and a second pole of said most discharged battery.

67. The apparatus of claim 38 wherein said controller is configured to maintain at least part of said charging current to said most discharged battery until the state of charge of said most discharged battery is within a range of the state of charge of a battery in said system having the next higher state of charge relative to the state of charge of said most discharged battery as determined from a last produced set of state of charge signals, before producing a succeeding set of state of charge signals.

68. The apparatus of claim 38 wherein said current distributor has a plurality of battery ports and wherein said controller is configured to determine which of said battery ports has a battery connected thereto.

69. The apparatus of claim 68 wherein said controller is configured to successively determine which of said battery ports has a battery connected thereto at a frequency less than a frequency at which said set of state of charge signals is produced.

70. The apparatus of claim 69 wherein said controller is configured to implement and set a port detection timer after determining which of said battery ports has a battery connected thereto and to re-determine which of said ports has a battery connected thereto when said port detection timer has timed-out.

71. The apparatus of claim 68 wherein said controller is configured to scan said battery ports to determine which of said battery ports has a battery connected thereto.

72. The apparatus of claim 71 wherein said controller is configured to scan said battery ports by causing each of said battery ports to be successively activated and, while a battery port is activated, causing a current to be drawn from said battery port.

73. The apparatus of claim 72 wherein said controller is configured to determine whether said current drawn from said battery port meets a test criterion and to identify said battery port as having a battery connected thereto when said test criterion is met.

74. The apparatus of claim 73 wherein said controller is configured to determine that said current drawn from said battery port meets said test criterion when said current drawn from said battery port exceeds a test current value after a threshold period of time.

75. An apparatus for charging batteries in a system of batteries, the apparatus comprising:
means for producing a set of state of charge signals indicative of the states of charge of each battery in said system;
means for successively identifying, from said state of charge signals, a most discharged battery in said system; and
means for applying a pulse of charging current to said most discharged battery for at least part of a first period of time less than a period of time required to fully charge said most discharged battery up to the same charge as a next most discharged battery in said system before identifying a succeeding most discharged battery in said system.

76. In a charger for charging batteries in a system of batteries, where the charger comprises a state of charge signal generator operable to produce state of charge signals indicative of the states of charge of each battery in said system, a controllable power supply operable to produce a charging current, a current distributor operable to selectively connect each battery in said system to said power supply in response to a control signal, and a controller operable to communicate with said state of charge signal generator, said power supply and said current distributor, a method of operating the controller, the method comprising:
causing said controller to communicate with said state of charge signal generator to produce a set of said state of charge signals indicative of the states of charge of each battery in said system;
causing said controller to successively identify, from said state of charge signals, a most discharged battery in said system; and
causing said controller to produce said control signal to cause said current distributor to selectively connect said most discharged battery to said power supply such that said most discharged battery receives a pulse of said charging current from said power supply for at least part of a period of time less than a period of time required to fully charge said most discharged battery up to the same charge as a next most discharged battery in said system, before causing said controller to identify a succeeding most discharged battery in said system.

77. A computer readable medium comprising codes for directing a controller in a charger for charging batteries in a system of batteries, where the charger comprises a state of charge signal generator operable to produce state of charge signals indicative of the states of charge of each battery in said system, a controllable power supply operable to produce a charging current and a current distributor operable to selectively connect each battery in said system to said power supply in response to a control signal, and wherein the controller is operable to communicate with said state of charge signal generator, said power supply and said current distributor, the computer readable medium comprising codes readable by the controller for directing the controller to:
communicate with said state of charge signal generator to successively produce a set of said state of charge signals indicative of the states of charge of each battery in said system;
successively identify, from said state of charge signals, a most discharged battery in said system; and
produce said control signal to cause said current distributor to selectively connect said most discharged battery to said power supply such that said most discharged battery receives a pulse of charging current from said power supply for at least part of a period of time less than a period of time required to fully charge said most discharged battery up to the same charge as a next most discharged battery in said system, before causing said controller to identify a succeeding most discharged battery in said system.

78. A method of charging a plurality of batteries, the method comprising charging individual batteries or battery banks in the plurality of batteries one at a time according to a dynamic charging sequence in which batteries or battery banks are added into the charging sequence in order of increasing state of charge as batteries or battery banks already in the charging sequence are charged to exceed the state of charge of a battery or battery bank having the next higher state of charge relative to the state of charge of the batteries already in the charging sequence, wherein said charging comprises applying pulses of charging current to said individual batteries or battery banks.

* * * * *